United States Patent
Soh et al.

(10) Patent No.: US 10,031,281 B2
(45) Date of Patent: Jul. 24, 2018

(54) DISPLAY APPARATUS

(71) Applicant: Samsung Display Co., Ltd., Yongin-Si, Gyeonggi-Do (KR)

(72) Inventors: Yongkwon Soh, Seongnam-si (KR); Joohyuk Park, Asan-si (KR); Kyunghoon Chae, Asan-si (KR); Sungyeon Hwang, Hwaseong-si (KR); Jinhyoung Kim, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/273,839

(22) Filed: Sep. 23, 2016

(65) Prior Publication Data
US 2017/0261684 A1 Sep. 14, 2017

(30) Foreign Application Priority Data

Mar. 8, 2016 (KR) .................. 10-2016-0027849

(51) Int. Cl.
*G09F 13/04* (2006.01)
*G09F 13/08* (2006.01)
*F21V 8/00* (2006.01)

(52) U.S. Cl.
CPC .......... *G02B 6/0093* (2013.01); *G02B 6/0045* (2013.01); *G02B 6/0068* (2013.01); *G02B 6/0088* (2013.01)

(58) Field of Classification Search
CPC .. G02B 6/0093; G02B 6/0088; G02B 6/0045; G02B 6/0068
USPC .................. 362/97.1, 97.2, 97.3, 97.4, 613
See application file for complete search history.

(56) References Cited

U.S. PATENT DOCUMENTS

| 2010/0080019 | A1 | 4/2010 | Iwasaki | |
| 2013/0321740 | A1* | 12/2013 | An | H05K 5/0217 349/58 |
| 2015/0192731 | A1 | 7/2015 | Kim et al. | |
| 2015/0219940 | A1* | 8/2015 | Kim | G02F 1/1336 362/612 |

(Continued)

FOREIGN PATENT DOCUMENTS

| JP | 2017037739 A | * | 2/2017 | ........... G02B 6/0055 |
| KR | 101267081 B1 | | 5/2013 | |

(Continued)

OTHER PUBLICATIONS

Machine English Translation of JP2017037739A Feb. 16, 2017 which is application No. JP20150157022.*

*Primary Examiner* — Anh Mai
*Assistant Examiner* — Glenn Zimmerman
(74) *Attorney, Agent, or Firm* — Cantor Colburn LLP

(57) ABSTRACT

A display apparatus includes a display panel which generates and display an image with light, the display panel curved at a first mean curvature with respect to a bending axis and defining a display surface thereof at which the image is displayed; a backlight unit includes a light source which generates the light, and a curved light guide plate which receives the light from the light source and provides the received light to the display panel, the light guide plate; and a protection member in which the backlight unit is accommodated, the protection member curved at a second mean curvature with respect to the bending axis, the second mean curvature being different from the first mean curvature.

16 Claims, 12 Drawing Sheets

(56) References Cited

U.S. PATENT DOCUMENTS

2015/0378188 A1* 12/2015 Moon .................. G02F 1/1333
    349/65
2017/0038524 A1* 2/2017 Mifune ................ G02B 6/0055

FOREIGN PATENT DOCUMENTS

| KR | 10-1319543 B1 | 10/2013 |
| KR | 101351050 B1 | 1/2014 |
| KR | 1020150025880 A | 3/2015 |

* cited by examiner

DISPLAY APPARATUS

This application claims priority to Korean Patent Application No. 10-2016-0027849, filed on Mar. 8, 2016, and all the benefits accruing therefrom under 35 U.S.C. § 119, the contents of which in their entirety are hereby incorporated by reference.

BACKGROUND (1) Field

The invention relates to a display apparatus, and more particularly, to a curved display apparatus having improved reliability.

(2) Description of the Related Art

Display apparatuses are classified into a transmissive type, transflective type and reflective type display apparatus. Each of such transmissive and transflective-type display apparatuses includes a display panel which generates and displays an image with light and a backlight unit which provides the light to the display panel.

The backlight unit includes a light source that generates and provides light and a light guide body that guides the light received from the light source in the direction of the display panel. The light source includes a circuit board and a plurality of light emitting blocks which are mounted on the circuit board. The plurality of light emitting blocks faces a light incident surface of the light guide body.

SUMMARY

One or more exemplary embodiment provides a display apparatus in which damage to a light source due to deformation of a light guide plate during use of the light source, is reduced or effectively prevented to improve reliability of the display apparatus.

An exemplary embodiment of the invention provides a display apparatus including a display panel which generates and display an image with light, the display panel curved at a first mean curvature with respect to a bending axis and defining a display surface thereof at which the image is displayed; a backlight unit including a light source which generates the light, and a curved light guide plate which receives the light from the light source and provides the received light to the display panel, the light guide plate; and a protection member in which the backlight unit is accommodated, the protection member curved at a second mean curvature with respect to the bending axis, the second mean curvature being different from the first mean curvature.

In an exemplary embodiment, the light guide plate may be curved, and a curvature of the light guide plate may have a value between the first mean curvature and the second mean curvature.

In an exemplary embodiment, the display surface may define a concave surface.

In an exemplary embodiment, the second mean curvature may be greater than the first mean curvature.

In an exemplary embodiment, the display surface may define a convex surface.

In an exemplary, the second mean curvature may be less than the first mean curvature.

In an exemplary embodiment, the light guide plate may define a front surface thereof facing the display panel, a rear surface thereof facing the front surface, and connecting surfaces thereof each of which connects the front surface to the rear surface. The protection member in a top plan view may include: sidewalls which together surround the connecting surfaces; and a support provided in plurality each respectively disposed at intersections of two sidewalls among the sidewalls of the protection member and each facing a portion of the connecting surfaces.

In an exemplary embodiment, the light source may be fixed to a first sidewall among the sidewalls, first and second supports among the supports of the protection member may be disposed at the first sidewall. a connecting surface facing the first sidewall among the connecting surfaces is defined as a first light incident surface of the light guide plate, the first sidewall defines a first support surface to which the first light source is fixed, and the first and second supports each define a second support surface parallel to the first support surface and facing the first light incident surface.

In an exemplary embodiment, a gap from the first light incident surface to the light source may be less than or equal to about 0.2 millimeter (mm).

In an exemplary embodiment, the light source may be provided in plurality and include a first light source fixed to the first sidewall and a second light source fixed to a second sidewall facing the first sidewall among the sidewalls of the protection member, third and fourth supports among the supports of the protection member may be disposed at the second sidewall, a connecting surface facing the second sidewall among the connecting surfaces of the light guide plate may be defined as a second light incident surface of the light guide plate, the second sidewall may define a second support surface to which the second light source is fixed, and the third and fourth supports may each define a second support surface parallel to the second support surface and facing the second light incident surface of the light guide plate.

In an exemplary embodiment, the protection member may further include in a direction between the first and second sidewalls thereof: a first guide provided in plural each respectively disposed spaced apart from the first and second supports at the first sidewall, and a second guide provided in plural each respectively disposed spaced apart from the third and fourth supports at the second sidewall.

In an exemplary embodiment, in the direction between the first and second sidewalls of the protection member, the first guides spaced apart from the first and second supports at the first sidewall, may respectively define first spaces therebetween, second guides spaced apart from the third and fourth supports at the second sidewall, may respectively define second spaces therebetween, the light guide plate may further define a planar portion thereof and a plurality of protrusions thereof which protrude from the planar portion, and each of the protrusions may be extended into a space among the first and second spaces.

In an exemplary embodiment, the protection member may further include a bottom portion commonly connected to the sidewalls and the supports to face the rear surface of the light guide plate.

In an exemplary embodiment of the invention, a display apparatus includes a display panel which generates and display an image with light, the display panel curved at a first mean curvature with respect to a bending axis and defining a display surface thereof at which the image is displayed; a backlight unit including: a light source which generates the light; and a light guide plate which receives the light from the light source and provides the received light to the display panel, the light guide curved with respect to the bending axis; and a protection member in which the backlight unit is accommodated, the protection member curved at a second mean curvature different from the first mean curvature. To define a variable mean curvature of the light guide plate accommodated in the protection member, the protection member restricts expansion and contraction of the light guide plate in a direction towards the light source and induces the expansion and contraction of the light guide plate in a thickness direction of the display apparatus.

In an exemplary embodiment, the variable mean curvature of the light guide plate may vary between the first mean curvature and the second mean curvature.

In an exemplary embodiment, the backlight unit may be driven by applying power thereto, and the variable mean curvature of the light guide plate may increase to approach a greater mean curvature among the first mean curvature and the second mean curvature as a continuous driving time of the backlight unit increases.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION

Figure 1:
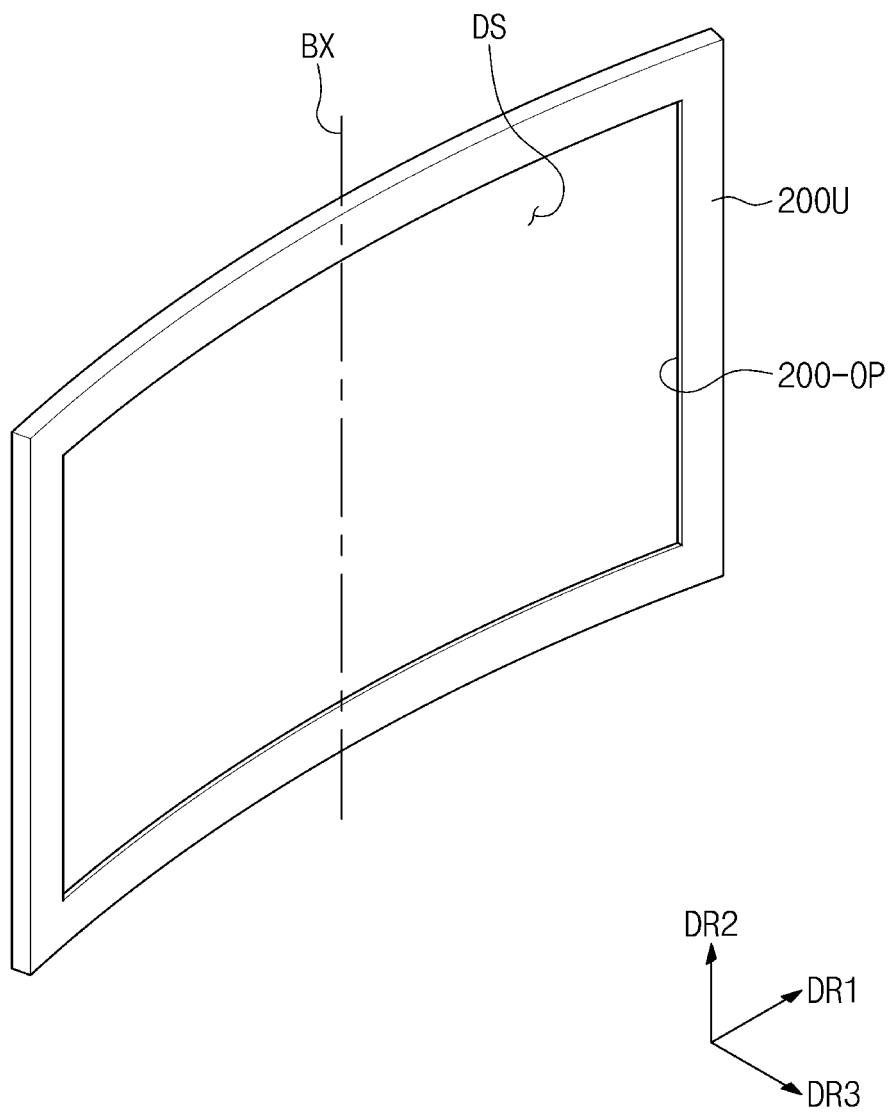
FIG. 1 is a perspective view of an exemplary embodiment of a display apparatus according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the invention will be described with reference to the accompanying drawings.

Figure 2A:
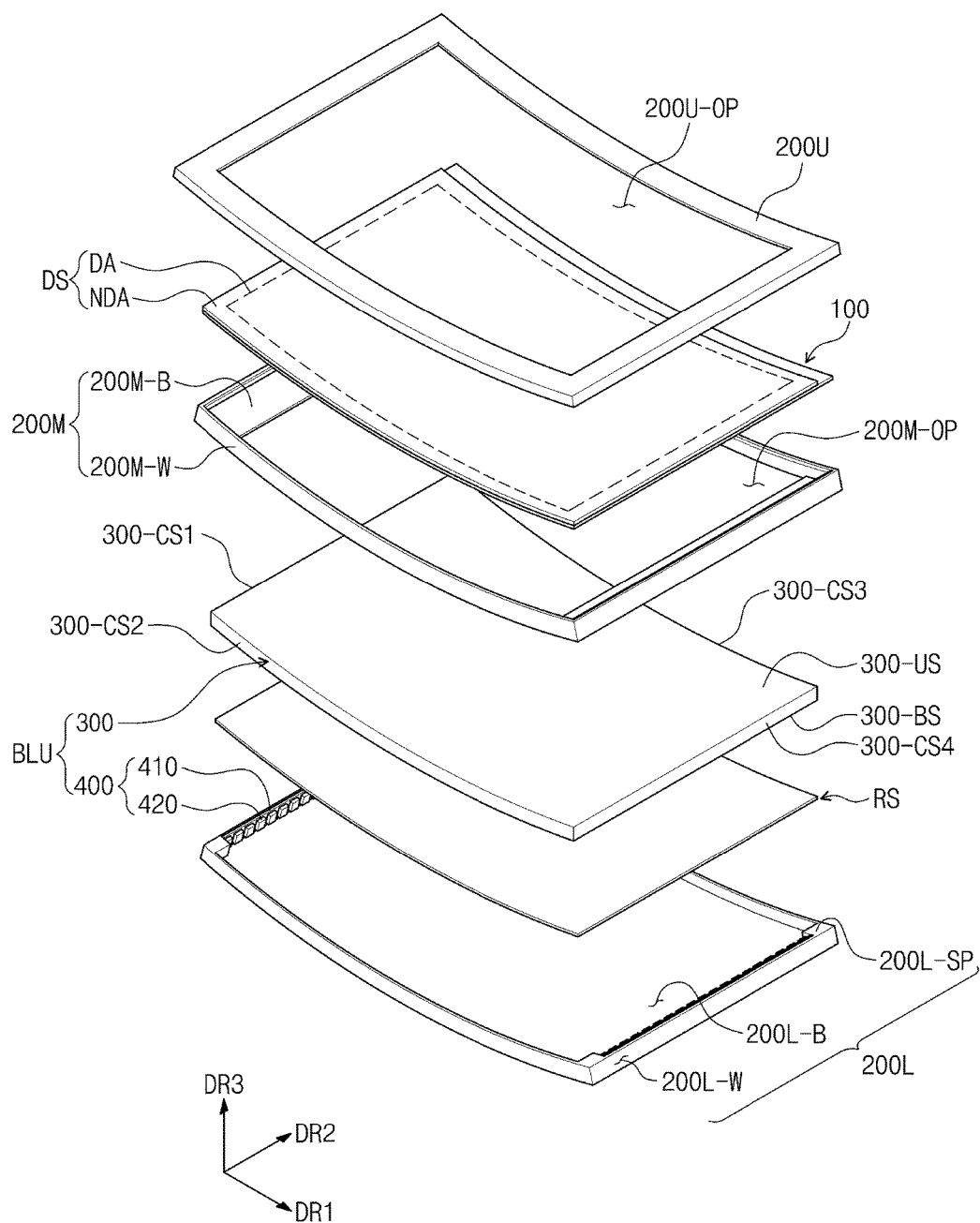
FIG. 2A is an exploded perspective view of the display apparatus of FIG. 1.
Figure 2B:
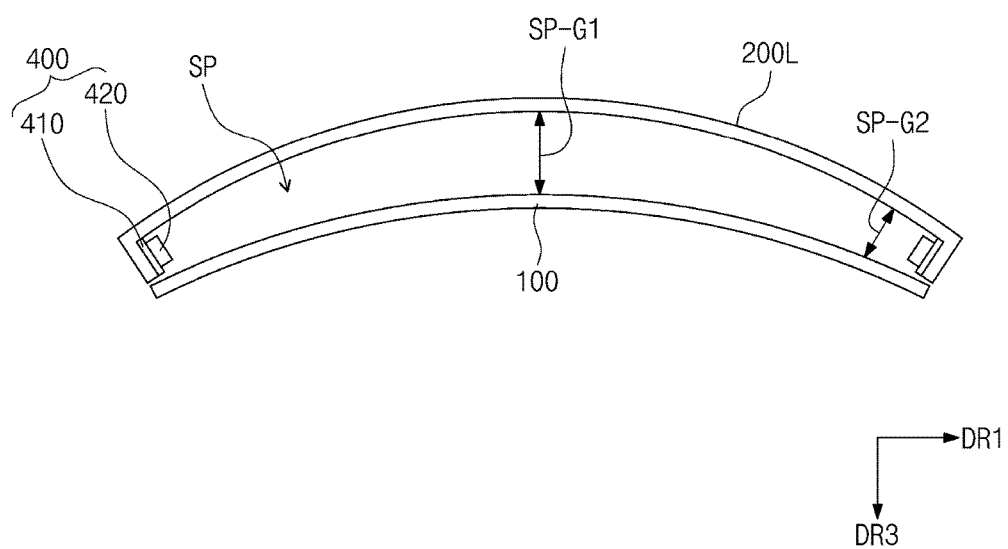
FIG. 2B is a schematic cross-sectional view illustrating a portion of constituent elements of the display apparatus of FIG. 1.

FIG. 1 is a perspective view of an exemplary embodiment of a display apparatus according to the invention. FIG. 2A is an exploded perspective view of the display apparatus of FIG. 1. FIG. 2B is a schematic cross-sectional view illustrating a portion of constituent elements of the display apparatus of FIG. 1. The display apparatus will be described with reference to FIGS. 1 to 2B.

The display apparatus has a curved state thereof in which elements thereof are curved from a plane defined by a first direction DR1 and a second direction DR2, which cross each other. FIG. 1 illustrates the curved state display apparatus of which both of opposing ends thereof are disposed separated from the plane in a third direction DR3 with respect to a bending axis BX lengthwise extending in the second direction DR2. The third direction DR3 may represent a light transmission or viewing direction of the display apparatus.

A display surface DS is defined by the display apparatus and provided as a surface curved with respect to the plane defined by the first direction DR1 and the second direction DR2. In the illustrated exemplary embodiment, the display surface DS may be a concave surface. However, this configuration may be merely an example. In an exemplary embodiment, for example, the display surface DS may be provided as a convex surface, and the invention is not limited thereto.

The display apparatus includes a display panel 100, a plurality of protection members 200U, 200M and 200L, and a backlight unit BLU. The backlight unit BLU may include a light guide plate 300 and a light source member 400 member. The display panel 100, the protection members 200U, 200M and 200L, the light guide plate 300, and the light source member 400 are assembled with each other to form one display apparatus. These features may be considered constituent elements of the display apparatus.

The display panel 100 generates and displays an image according to an electrical signal and light provided thereto. The display surface DS is defined by the display panel 100. The display surface DS is divided into a display area DA at which the generated image is displayed and a non-display area NDA which surrounds the display area DA and at which the generated image is not displayed. Although the electrical signal is applied to the non-display area NDA, an image is not displayed at the non-display area NDA.

The display panel 100 receives light from the backlight unit BLU to generate an image. In an exemplary embodiment, for example, the display panel 100 may be a liquid crystal display panel or an electrophoretic display panel. In the illustrated exemplary embodiment, the liquid crystal display panel will be described as an example.

The display panel 100 may be in a curved state corresponding to that of the display apparatus. The display panel 100 is curved with respect to the bending axis BX. In an exemplary embodiment, for example, the display panel 100 may be curved at a first mean curvature. In the illustrated exemplary embodiment, the mean curvature may be defined as a mean value of curvatures at respective points along a curved direction of a corresponding constituent element among those of the display apparatus.

Each of the protection members 200U, 200M and 200L may be in a curved state corresponding to that of the display apparatus. In the illustrated exemplary embodiment, the protection members 200U, 200M and 200L may be arranged so that each center of the protection members 200U, 200M and 200L and a center of the display panel 100 are aligned in the third direction DR3 or in the top plan view.

In an exemplary embodiment, for example, the centers of each of the protection members 200U, 200M and 200L and the center of the display panel 100 may be disposed on a straight line extending from the bending axis BX and in the third direction DR3, in a cross-section. However, this configuration may be merely an example. In an exemplary embodiment, for example, if the protection members 200U, 200M and 200L are capable of accommodating the curved state display panel 100, each or any of the protection members 200U, 200M and 200L may be curved in various shapes which accommodate the curved state display panel 100, and the invention is not limited thereto.

The protection members 200U, 200M and 200L of the display apparatus include an upper protection member 200U, an intermediate protection member 200M and a lower protection member 200L. The upper protection member 200U is disposed on the display panel 100 to cover the display panel 100. The upper protection member 200U defines an outer appearance of a front surface of the display apparatus.

A predetermined opening 200U-OP is defined in and by the upper protection member 200U. The display area DA of the display surface DS may be exposed to outside the display apparatus by the opening 200U-OP, and the non-display area NDA of the display surface DS may be covered (e.g., not exposed) by the upper protection member 200U.

The intermediate protection member 200M is disposed between the upper protection member 200U and the lower protection member 200L. The intermediate protection member 200M includes an intermediate bottom portion 200M-B and an intermediate sidewall portion 200M-W.

The intermediate bottom portion 200M-B supports thereon at least a portion of the display panel 100. The intermediate bottom portion 200M-B may have a minimum planar area in the top plan view that does not affect the light emitted from the back light unit BLU.

The intermediate sidewall portion 200M-W is bent from the intermediate bottom portion 200M-B in the third direction DR3. The intermediate sidewall portion 200M-W surrounds the display panel 100 in the top plan view. One of the intermediate sidewall portion 200M-W and the intermediate bottom portion 200M-B may be extended bent to define the other one of the intermediate sidewall portion 200M-W and the intermediate bottom portion 200M-B.

A predetermined opening 200M-OP is defined in and by the intermediate protection member 200M, such as by the intermediate sidewall portion 200M-W. The opening 200M-OP may have a shape corresponding to an overall shape of the display panel 100. The intermediate protection member 200M stably accommodates therein the display panel 100 through the opening 200M-OP. In an exemplary embodiment of manufacturing the display apparatus, the display panel 100 may be disposed onto the intermediate bottom portion 200M-B through the opening 200M-OP.

The lower protection member 200L is disposed under the intermediate protection member 200M. The lower protection member 200L defines an outer appearance of a rear surface of the display apparatus.

The lower protection member 200L includes a lower bottom portion 200L-B and a lower sidewall portion 200L-W. The lower sidewall portion 200L-W is bent from the lower bottom portion 200L-B in the third direction DR3 to define a predetermined inner space with the lower bottom portion 200L-B. The back light unit BLU is accommodated in the inner space defined in and by the lower protection member 200L. One of the lower sidewall portion 200L-W and the lower bottom portion 200L-B may be extended bent to define the other one of the lower sidewall portion 200L-W and the lower bottom portion 200L-B.

The lower protection member 200L may be curved at a second mean curvature. Here, the second mean curvature is different from the first mean curvature of the display panel 100. A curvature of the light guide plate 300 is between the first mean curvature of the display panel 100 and the second mean curvature of the lower protection member 200L.

In an exemplary embodiment, for example, referring to FIG. 2B, the second mean curvature of the lower protection member 200L may be greater than the first mean curvature of the display panel 100. A curved degree of the lower protection member 200L may be greater than that of the display panel 100. Alternatively, the second mean curvature of the of the lower protection member 200L may be less than the first mean curvature of the display panel 100.

Thus, a predetermined space SP may be defined between the lower protection member 200L and the display panel 100 having the different mean curvatures from each other. The distance between the lower protection member 200L and the display panel 100 may be different from each other at respective points of the display panel 100 owing to the different mean curvatures.

In an exemplary embodiment, for example, a space distance SP-G1 between the lower protection member 200L and the display panel 100 in a central region of the display panel 100 may be greater than a space distance SP-G2 between the lower protection member 200L and the display panel 100 at an edge region of the display panel 100. Thus, the predetermined space SP between the lower protection member 200L and the display panel 100 may have a shape which defines a volume that varies from the central region of the display panel 100 toward the edge region of the display panel 100.

Referring again to FIG. 2A, the lower protection member 200L may further include or define a lower support 200L-SP provided in plurality. The lower supports 200L-SP protrude from the lower sidewall portion 200L-W to an inner space of the lower protection member 200L and support the light guide plate 300 within the lower protection member 200L. The lower supports 200L-SP and the lower sidewall portion 200L-W may define a space therebetween at which the light source member 400 is disposed.

The light guide plate 300 is accommodated in the inner space defined by the lower protection member 200L. The light guide plate 300 may include a light-exiting top surface 300-US, a bottom surface 300-BS, and a plurality of connecting surfaces 300-CS1, 300-CS2, 300-CS3 and 300-CS4 which respectively connect the top surface 300-US and the bottom surface 300-BS to each other.

The top surface 300-US faces the display panel 100. The top surface 300-US of the light guide plate 300 may generally have a planar shape and a planar area corresponding to those of the display surface DS. The light guide plate 300 emits light to the display panel 100 through the top surface 300-US.

The connecting surfaces 300-CS1, 300-CS2, 300-CS3 and 300-CS4 may be surrounded by sidewalls of the lower sidewall portion 200L-W of the lower protection member 200L. At least one of the connecting surfaces 300-CS1, 300-CS2, 300-CS3 and 300-CS4 may be defined as a light incident surface through which light is incident from the light source member 400 to the light guide plate 300. In the illustrated exemplary, the light incident surface of the light guide plate 300 is defined by each of the two connecting surfaces 300-CS1 and 300-CS4 opposing each other.

Opposing ends of the light incident surfaces 300-CS1 and 300-CS4 are supported by the lower supports 200L-SP, respectively. For the support, a pair of lower supports 200L-SP opposing each other in the second direction DR2 may restrict movement of the light guide plate 300 at the light incident surfaces 300-CS1 and 300-CS4 thereof, in the second direction DR2. Although not shown, a predetermined coupling member may be further disposed between the light incident surfaces 300-CS1 and 300-CS4 and the lower supports 200L-SP to couple opposing ends of the light incident surfaces 300-CS1 and 300-CS4 to the opposing lower supports 200L-SP, respectively. Here, with such coupling member, the light incident surfaces 300-CS1 and 300-CS4 may be more stably supported by the supports 200L-SP.

In the light guide plate 300 according to the illustrated exemplary embodiment of the invention, only the light incident surfaces 300-CS1 and 300-CS4 are substantially supported by the lower supports 200L-SP. Thus, the curved degree of the light guide plate 300 may be different from that of the lower protection member 200L. This will be described later in detail.

The light source member 400 receives an electrical signal to generate light, thereby supplying the generated light to the outside thereof. In the illustrated exemplary embodiment, the light source member 400 may be provided in plurality to be separated from each other within the display apparatus. A light source is disposed arranged in plurality inside the sidewalls of the lower sidewall portion 200L-W facing each other, with the light guide plate 300 therebetween. Referring to FIG. 2A for example, light source members 400 are disposed spaced apart from each other within the sidewalls of the lower sidewall portion 200L-W, in the first direction, and the light guide plate 300 is between the light source members 400. Hereinafter, one light source member 400 will be exemplified for easiness of description.

The light source member 400 may be fixed to the lower protection member 200L. Here, the light source member 400 is fixed to the lower sidewall portion 200L-W such as by using a predetermined adhesion member (not shown) or a predetermined coupling member (not shown) such as a screw.

The light source member 400 includes a circuit board 410 and a light source 420 which is provided in plurality. The circuit board 410 may have a bar shape of which a length thereof extends in the second direction DR2. The circuit board 410 includes an insulation layer (not shown) and a wiring layer (not shown).

The light sources 420 of a light source member 400 are mounted on the circuit board 410 thereof and electrically connected to the wiring layer of the circuit board 410. The light sources 420 receive an electrical signal from the circuit board 410 to generate light and emit the generated light, thereby supplying the light to the light guide plate 300. The electrical signal includes a power source voltage and/or a dimming signal.

Each of the light sources 420 includes at least one light emitting element. In an exemplary embodiment, for example, the light emitting element may be a light emitting diode or a laser element. In addition, the light source member 400 may further include active elements mounted on the circuit board 410 to control the light sources 420.

Also, the display apparatus may further include a reflection sheet RS. The reflection sheet RS is disposed between the light guide plate 300 and the lower protection member 200L. The reflective sheet RS reflects a portion of light, which is emitted to a rear surface of the light guide plate 300, of light guided within the light guide plate 300 to allow the light to be incident again into the light guide plate 300. Therefore, the display apparatus may be improved in light efficiency.

Figure 3A:
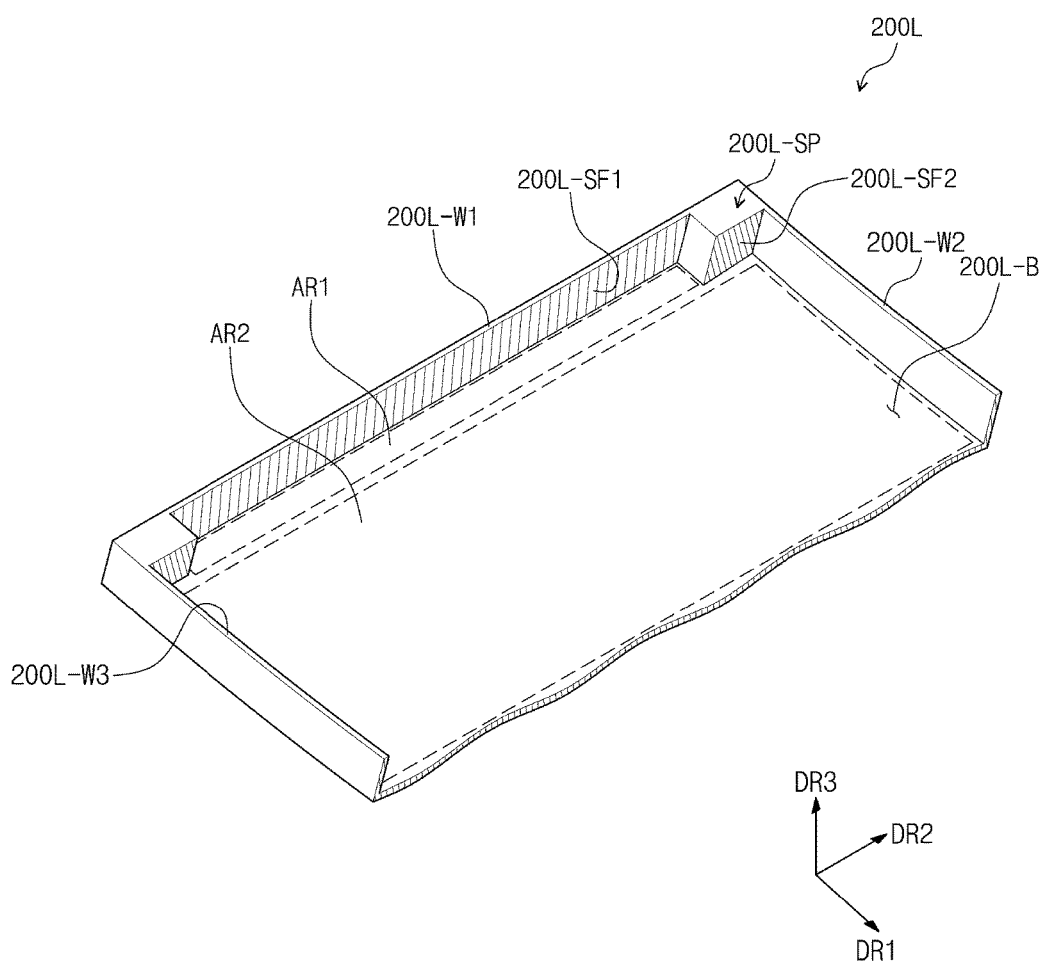
FIG. 3A is a partial perspective view of an exemplary embodiment of a lower protection member of the display apparatus according to the invention.
Figure 3B:
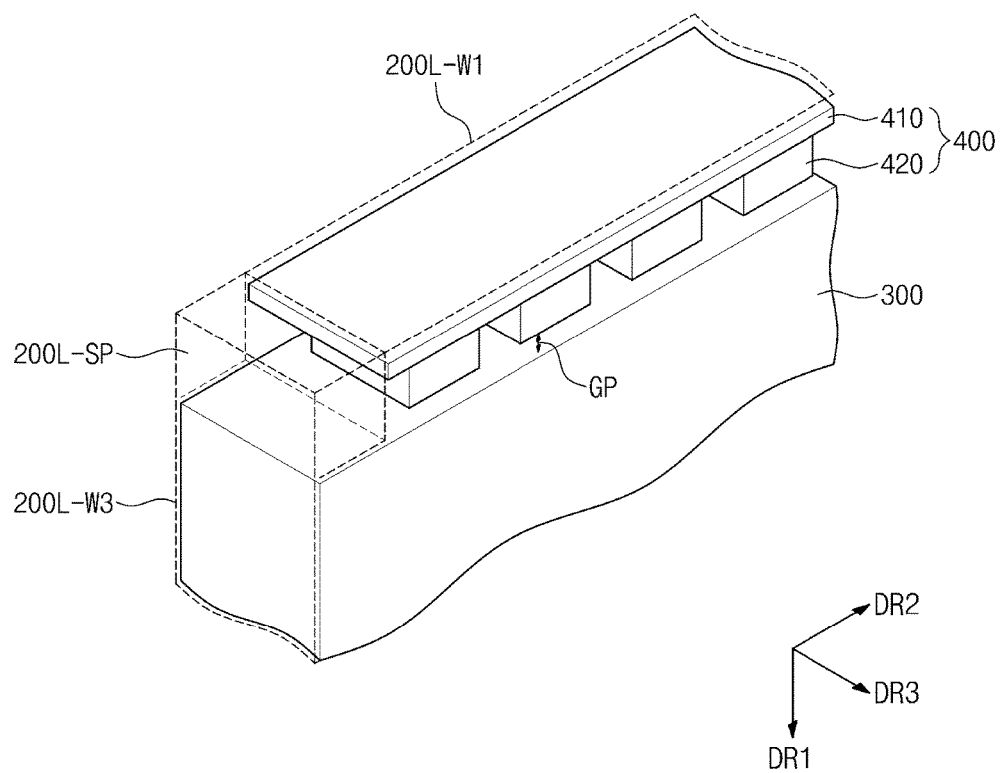
FIG. 3B is a partial perspective view of an exemplary embodiment of constituent elements of the display apparatus with respect to the lower protection member of FIG. 3A according to the invention.

FIG. 3A is a partial perspective view of an exemplary embodiment of a lower protection member of a display apparatus according to the invention. FIG. 3B is a partial perspective view illustrating an exemplary embodiment of a portion of constituent elements of a display apparatus with respect to the lower protection member of FIG. 3A according to the invention.

In FIG. 3B, for ease of description, edges or portions of the lower protection member are expressed by a dotted line. Hereinafter, an exemplary embodiment of a display apparatus according to the invention will be described with reference to FIGS. 3A and 3B.

As illustrated in FIG. 3A, the lower sidewall portion 200L-W (FIG. 2) may be divided into a first sidewall portion 200L-W1, a second sidewall portion 200L-W2, a third sidewall portion 200L-W3 which is opposite to the second sidewall portion 200L-W2, and a fourth sidewall portion (not shown) which is opposite to the first sidewall portion 200L-W1. Opposing ends of the first sidewall portion 200L-W1 in a length direction thereof are respectively coupled to the second sidewall portion 200L-W2 and the third sidewall portion 200L-W3.

The lower supports 200L-SP may be respectively disposed at areas in which two sidewall portions of the lower sidewall portion 200L-W are connected to each other, for example, an area at which the first sidewall portion 200L-W1 and the second sidewall portion 200L-W2 are connected to each other, and an area at which the first sidewall portion 200L-W1 and the third sidewall portion 200L-W3 are connected to each other. Each of the lower supports 200L-SP is connected to two sidewall portions among the sidewalls of the lower sidewall portion 200L-W. Thus, the lower supports 200L-SP may be respectively disposed at inner areas corresponding to corners inside the lower protection member 200L.

An inner space defined by the lower protection member 200L may be divided into a plurality of areas by the lower supports 200L-SP. In FIG. 3A, for example, the inner space may be divided into a first area AR1 and a second area AR2, which are adjacent to each other.

In a top plan view, the first area AR1 is defined by a portion of the lower bottom portion 200L-B bounded by the first sidewall portion 200L-W1 and the lower supports 200L-SP at the first sidewall portion 200L-W1. Although not shown, in the top plan view, a first area AR1 is also defined by a portion of the lower bottom portion 200L-B bounded by the fourth sidewall portion (not shown) and the lower supports 200L-SP at the fourth sidewall portion. The light source member (see reference numeral 400 of FIG. 2) may be disposed on the first area AR1. Accordingly, the first sidewall portion 200L-W1 defines a first support surface 200L-SF1 of the lower protection member 200L. The circuit board (see reference numeral 320 of FIG. 2) is fixed to the first support surface 200L-SF1, and the first support surface 200L-SF1 supports thereon the light source member 400.

In the top plan view, the second area AR2 is defined by a portion of the lower bottom portion 200L-B bounded by the lower supports 200L-SP, the second sidewall portion 200L-W2 and the third sidewall portion 200L-W3. The light guide plate 300 may be disposed on the second area AR2. The first and second areas AR1 and AR2 may define a whole of the lower bottom portion 200L-B of the lower protection member 200L.

Inner surfaces of the lower supports 200L-SP respectively define a second support surface 200L-SF2. The second support surface 200L-SF2 supports the light guide plate 300. In detail, the second support surfaces 200L-SF2 at the first and fourth sidewall portions may respectively support a light incident surface of the light guide plate 300. For the support, a pair of lower supports 200L-SP at the first sidewall portion 200L-W1 and a pair of lower supports 200L-SP at the fourth sidewall portion oppose each other in the first direction DR2 and restrict movement of the light guide plate 300 in the first direction DR1.

FIG. 3B illustrates a state in which the light source member 400 is fixed to and assembled with the first sidewall portion 200L-W1, and the light guide plate 300 is supported by the lower supports 200L-SP at the first sidewall portion 200L-W1. As illustrated in FIG. 3B, since the light source member 400 and the light guide plate 300 are respectively disposed on the first and second areas AR1 and AR2 bounded by the lower supports 200L-SP, a predetermined gap GP may be defined between the light source member 400 and the light guide plate 300. The gap GP may be defined between a distal end of the light source 420 and a corresponding light incident surface of the light guide plate 300. The gap GP may represent a minimum distance between the light source member 400 and the light guide plate 300.

The gap GP may vary according to sizes of the lower supports 200L-SP, such as a dimension of the lower supports 200L-SP in the first direction DR1. If the gap GP is relatively small, the light guide plate 300 is easily damaged by the heat generated from the light sources 420. If the gap GP is relatively large, a receiving rate of light provided from the light sources 420 may be reduced to deteriorate light efficiency of the display apparatus.

In an exemplary embodiment, for example, the gap GP may be less than or equal to 0.2 millimeter (mm), but the invention is not limited thereto. In exemplary embodiments, a value of the gap GP is defined such that the reliability and light efficiency of the light guide plate 300 is maintained.

The light guide plate 300 may include or be formed of any of a number of materials through which light may propagate. In an exemplary embodiment, for example, the light guide plate 300 may include or be formed of polycarbonate ("PC") or polymethylmethacrylate ("PMMA"). Accordingly, the light guide plate 300 may expand or contract (i.e., deformed) under the influence of the heat generated from the light source member 400 during the use of the display apparatus. If the light guide plate 300 is deformed in the first direction DR1, the light source member 400 may be damaged or broken by collision with the light guide plate 300 due to the expansion of the light guide plate 300, or the light guide plate 300 may be damaged by the heat of the light source member 400.

In one or more exemplary embodiment of the display apparatus according to the invention, the gap GP may be uniformly maintained during use of the display apparatus. One or more exemplary embodiment of the display apparatus according to the invention may further include the lower protection member supports 200L-SP to reduce or effectively prevent the light guide plate 300 from being expanded in the direction toward the light source member 400. Thus, where the gap GP is uniformly maintained, damage of the light guide plate 300 during use of the display apparatus may be reduced or effectively prevented to improve the reliability of the display apparatus.

Figure 4A:
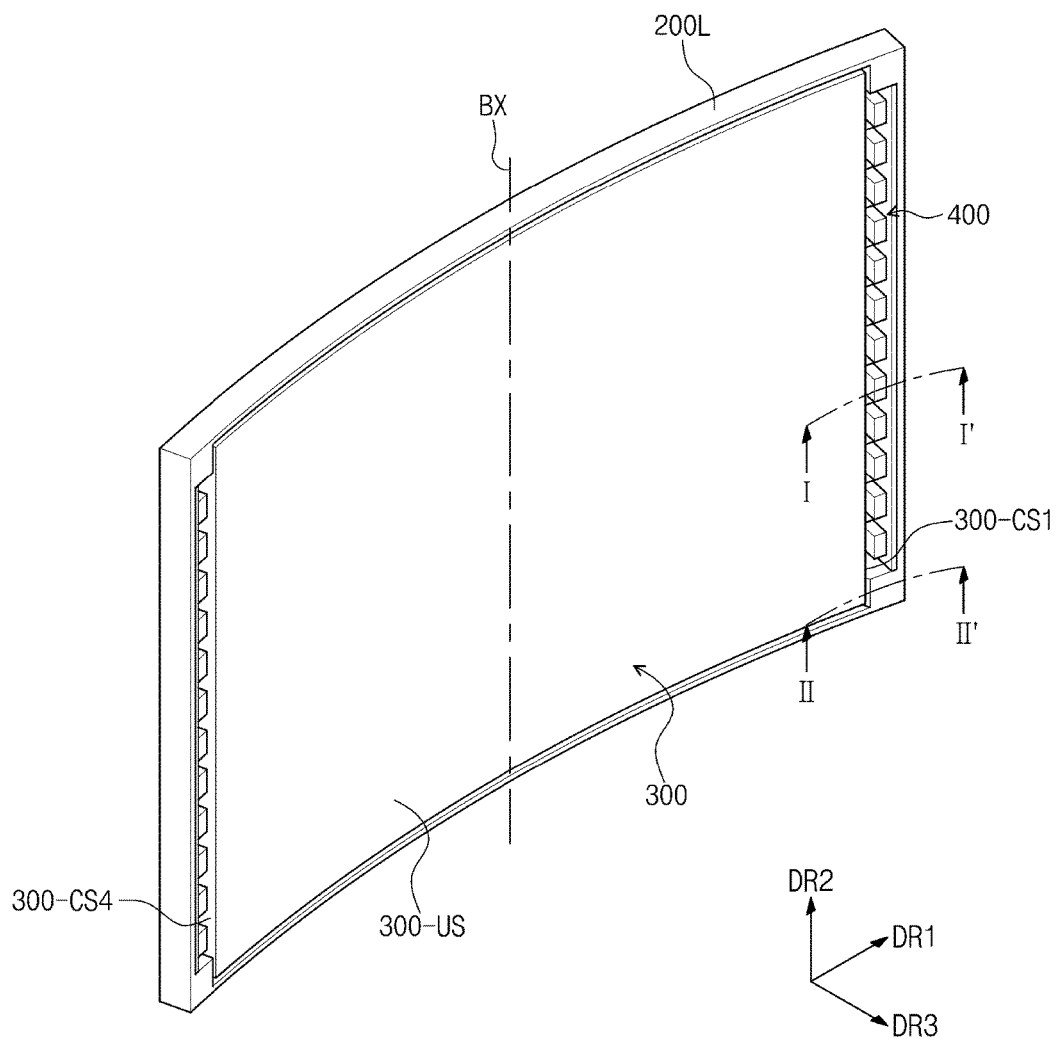
FIG. 4A is a perspective view illustrating a coupled state of another exemplary embodiment of a portion of constituent elements of the display apparatus according to the invention.
Figure 4B:
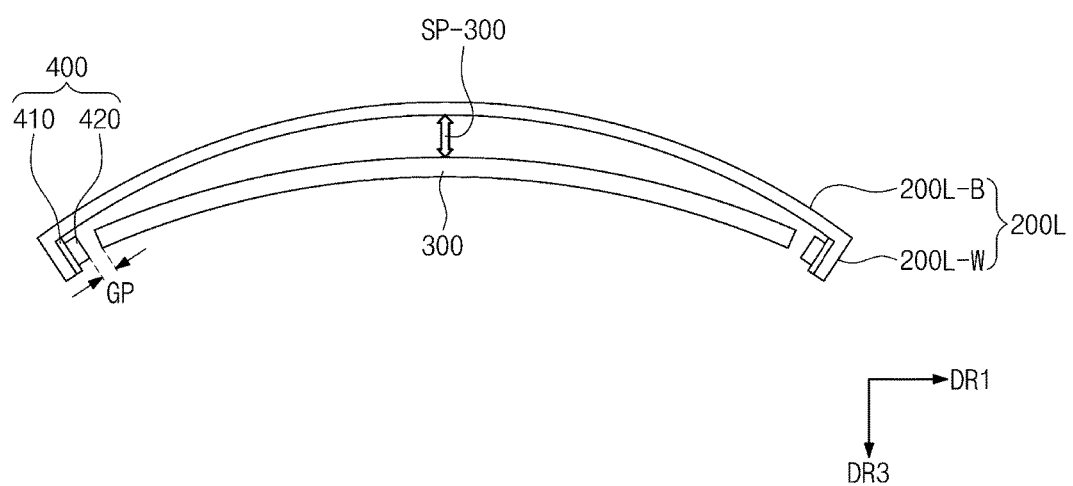
FIG. 4B is a cross-sectional view of the portion of the constituent elements of the display apparatus in FIG. 4A.

FIG. 4A is a perspective view illustrating a coupled state of another exemplary embodiment of a portion of constituent elements of a display apparatus according to the invention. FIG. 4B is a cross-sectional view illustrating the portion of the constituent elements of the display apparatus in FIG. 4A.

FIG. 4A illustrates a state in which the backlight unit (BLU in FIG. 2A) is coupled to the lower protection member 200L, and FIG. 4B illustrates a schematic cross-sectional view of the coupled state illustrated in FIG. 4A.

As illustrated in FIGS. 4A and 4B, the light guide plate 300, which is assembled with the lower protection member 200L, is in a curved state. Here, a curved degree of the light guide plate 300 may be different from that of the lower protection member 200L.

In an exemplary embodiment, for example, a curvature at one point of the light guide plate 300 may be different from that at a corresponding point of the protection member 200L. A mean curvature of the light guide plate 300 is less than that of the lower protection member 200L. The mean curvature of the light guide plate 300 may be a mean value of curvatures at respective points along a curved direction of the light guide plate 300, and the mean curvature of the lower protection member 200L may be a mean value of curvatures at respective points along a curved direction of the lower protection member 200L.

In exemplary embodiments, the curvature of the light guide plate 300 according to the invention may vary with respect to the curvature of the lower protection member 200L. The light guide plate 300 may be in a curved state with a curvature different from the mean curvature of the lower protection member 200L when the light guide plate 300 is coupled to the lower protection member 200L.

According to exemplary embodiments of the invention, opposing ends of the light guide display 300 may be respectively supported by opposing lower supports 200L-SP to uniformly maintain the gap GP between the light guide plate 300 and the light source member 400. That is, since the opposing lower supports 200L-SP uniformly maintain the gap GP, when the light guide plate 300 is expanded by the heat generated from the light source member 400, the expansion of the light guide plate 300 in the direction of the light source member 400 is reduced or prevented by the lower supports 200L-SP. Accordingly, the damage of the light source 420 by the curved state light guide plate 300, which is being expanded, and the damage of the curved state light guide plate 300 by the heat, may be reduced or effectively prevented.

In addition, the light guide plate 300 may be extended in a direction of the bottom part 200L-B (e.g., the third direction DR3) by the heat generated from the light source member 400. A space defined by a difference in curvature between the light guide plate 300 and the lower protection member 200L may substantially correspond to a deformable space SP-300 in which the light guide plate 300 may expand and contract. The light guide plate 300 may have a freedom of movement to define different curvatures according to the thermal expansion or contraction thereof because the light guide plate 300 defines the deformable space SP-300 with the lower protection member 200L.

When the deformation of the light guide plate 300 is suppressed such as toward the light source member 400, cracks may occur in the light guide panel 300 due to an increase of internal stress by the cracks. In one or more exemplary embodiment of the display apparatus according to the invention, the lower supports 200L-SP at opposing ends of the light guide plate 300 induce expansion of the light guide plate 300 by the heat from the light source member 400 to a direction which is different from the direction of the light source member 400, while uniformly maintaining the gap GP between the light guide plate 300 and the light source member 400. That is, the lower supports 200L-SP at opposing ends of the light guide plate 300 induce expansion of the light guide plate 300 by the heat from the light source member 400 in the third direction DR3 within the space SP-300. Thus, not only is breakage of the light source member 400 by the expansion of the light guide plate in the first direction DR1 reduced or effectively prevented, damage of the light guide plate 300 may be reduced or effectively prevented by inducing the free deformation of the light guide plate 300 in the third direction DR3.

Figure 5A:
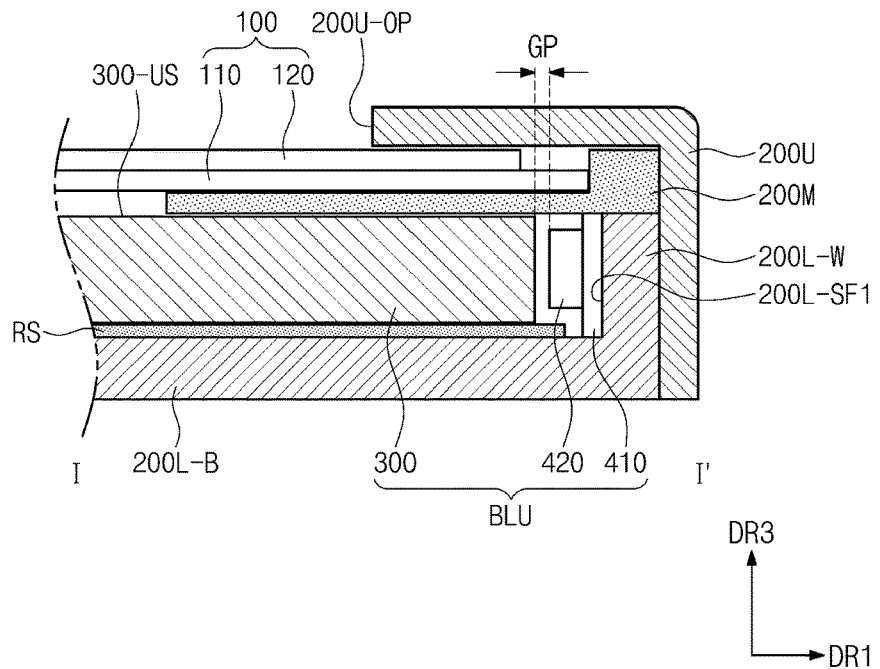
FIG. 5A is a cross-sectional view taken along line I-I' of FIG. 4A.
Figure 5B:
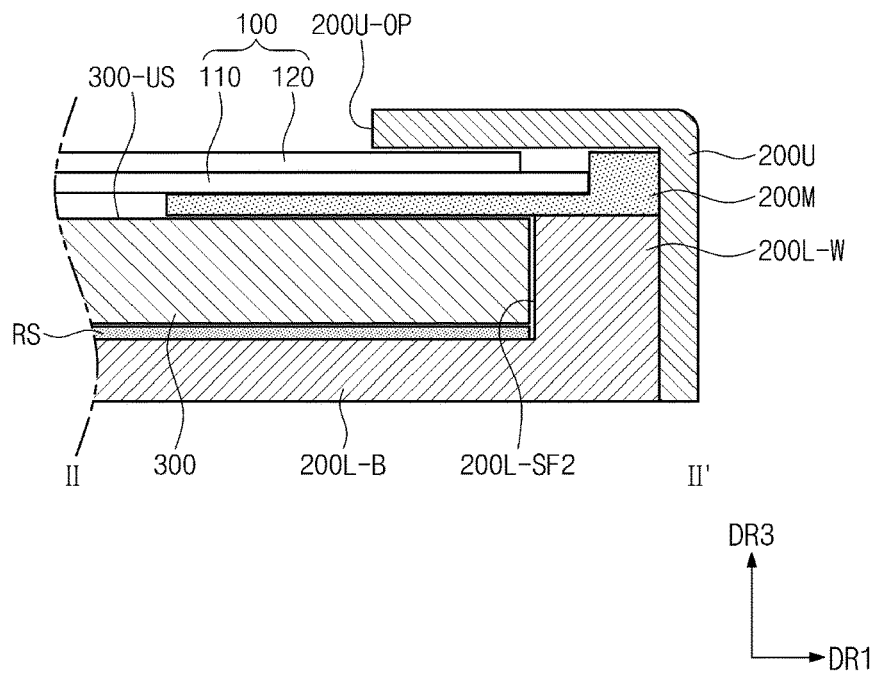
FIG. 5B is a cross-sectional view taken along line II-II' of FIG. 4A.

FIG. 5A is a cross-sectional view taken along line I-I' of FIG. 4A. FIG. 5B is a cross-sectional view taken along line II-II' of FIG. 4A. An exemplary embodiment of a display apparatus according to the invention will be described with reference to FIGS. 5A and 5B.

As illustrated in FIG. 5A, the display panel 100 is accommodated in the intermediate protection member 200M. The display panel 100 includes a first display substrate 110, a second display substrate 120, and an optical medium such as a liquid crystal layer (not shown) disposed between the first and second display substrates 110 and 120. The intermediate protection member 200M separates the backlight unit BLU from the display panel 100 while stably accommodating the display panel 100 therein.

The upper protection member 200U covers the display panel 100 and the lower protection member 200L. Accordingly, the upper protection member 200U may define an outer appearance of the front and side surfaces of the display apparatus.

The lower protection member 200L accommodates the backlight unit BLU therein. The light source member 400 is coupled to the first support surface 200L-SF1 (refer to FIG. 3A) defined by the sidewall portion 200L-W. The light guide plate 300 is disposed on the bottom portion 200L-B. The light guide plate 300 and the light source member 400 are spaced apart from each other to maintain the above-described gap GP therebetween.

As illustrated in FIG. 5B, the light incident surface of the light guide plate 300 is supported by the second support surface 200L-SF2 (refer to FIG. 3A) defined by the pair of lower supports 200L-SP at the light incident surface end of the light guide plate 300. Since movement of the light guide plate 300 toward the light source member 400 is restricted by support of the second support surfaces 200L-SF2 of the pair of lower supports 200L-SP, the gap GP between the light source member 400 and the light guide plate 300 may be uniformly maintained.

Figure 6A:
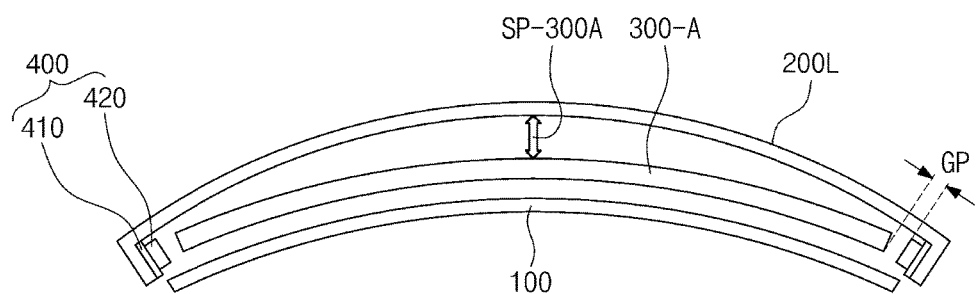
FIG. 6A is a schematic cross-sectional view illustrating an exemplary embodiment of a first state of the display apparatus according to the invention.
Figure 6B:
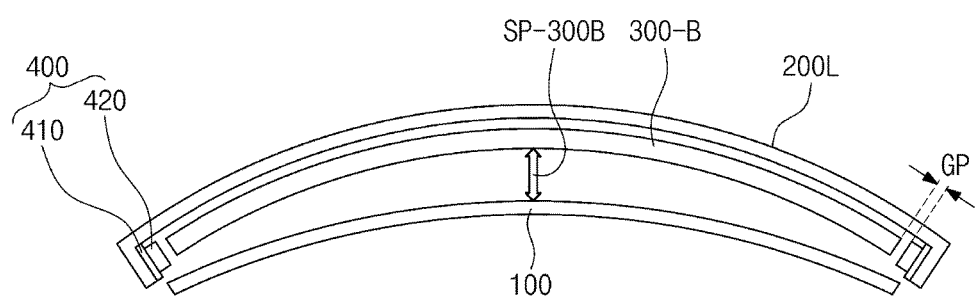
FIG. 6B is a schematic cross-sectional view illustrating an exemplary embodiment of a second state of the display apparatus in FIG. 6A according to the invention.

FIG. 6A is a schematic cross-sectional view illustrating an exemplary embodiment of a first state of a display apparatus according to the invention. FIG. 6B is a schematic cross-sectional view illustrating an exemplary embodiment of a second state of the display apparatus in FIG. 6A according to the invention.

Hereinafter, exemplary embodiments of curved states of a display apparatus according to the invention will be described with reference to FIGS. 6A and 6B. Repeated descriptions related to reference numerals already described for FIGS. 1 to 5B will be omitted.

FIG. 6A illustrates the first curved state of the display apparatus, e.g., a contracted state of the light guide plate. The first state of the light guide plate may correspond to a state in which the display apparatus is assembled but is not in use or in which time has elapsed after power has been applied to the display apparatus. That is, there is a minimal amount of heat in the display apparatus from the light source member such that the light guide plate is not deformed by the minimal amount of heat.

FIG. 6B illustrates the second curved state of the display apparatus, e.g., an expanded state of the light guide plate. The second state of the light guide plate corresponds to a state in which the display apparatus is in use or a short time has elapsed after power is applied to the display apparatus. That is, there is an amount of heat in the display apparatus from the light source member such that the light guide plate is deformed by the amount of heat.

Referring to FIG. 6A, a light guide plate 300-A in the first state has a curvature similar to that of the display panel 100. Accordingly, the deformable space SP-300A of the light guide plate 300-A may be provided between the light guide plate 300-A and the lower protection member 200L. In this case, the deformation of the light guide plate 300-A may be expanded deformation.

Referring to FIG. 6B, a light guide plate 300-B in the second state has a curvature similar to that of the lower protection member 200L. Accordingly, the deformable space SP-300B of the light guide plate 300-B may be provided between the light guide plate 300-B and the display panel 100. In this case, the deformation of the light guide plate 300-B may be contracted deformation.

As illustrated in FIGS. 6A and 6B, the gap GP between the light guide plate and the light source member 400 is uniformly maintained in both the first and second states. Since the light guide plate is supported by the lower supports (see reference symbol 200L-SP of FIG. 2) of the lower protection member 200L, the expansion of the light guide plate in the direction of the light source may be restricted and controlled to uniformly maintain the gap GP which is not affected by the deformation of the light guide plate.

Figure 7:
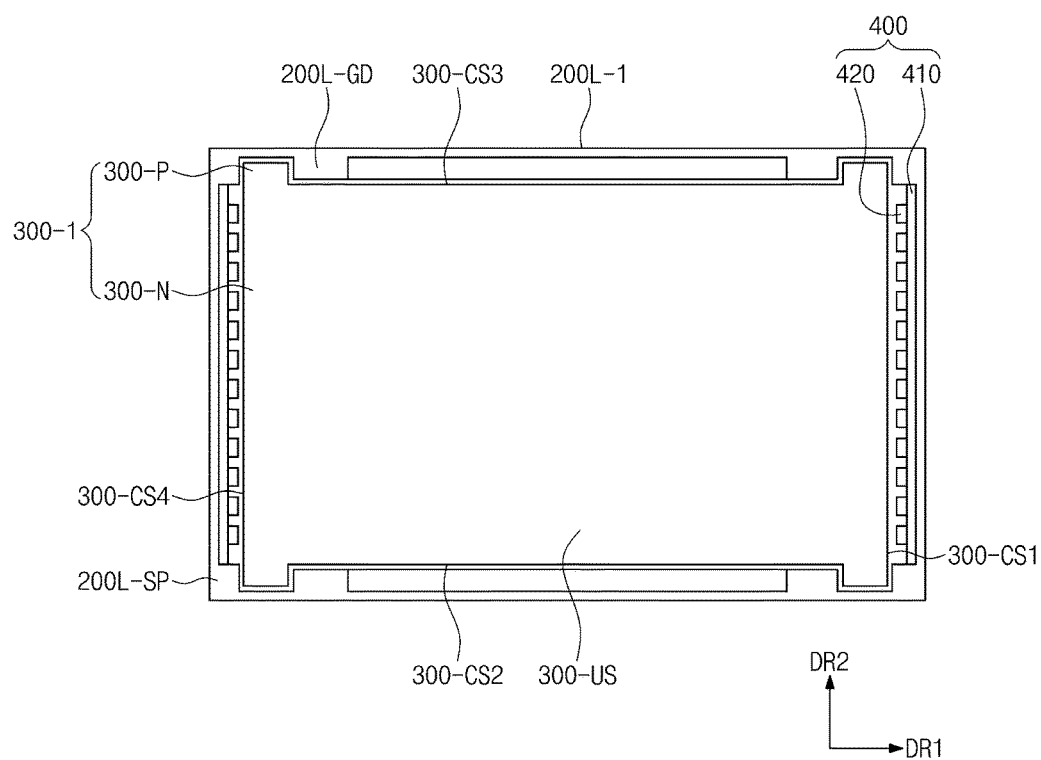
FIG. 7 is a top plan view illustrating a portion of constituent elements of the display apparatus according to the invention.

FIG. 7 is a top plan view illustrating still another exemplary embodiment of a portion of constituent elements of a display apparatus according to the invention. As illustrated in FIG. 7, the display apparatus may include a light guide plate 300-1 having various shapes and edge profiles, and a lower protection member 200L-1.

The lower protection member 200L-1 may further include or define a guide 200L-GD provided in plurality spaced apart from each other in the first direction DR1. Each guide 200L-GD is disposed to be spaced a predetermined distance from each of the lower supports 200L-SP.

The light guide plate 300-1 may include a planar portion 300-N and a protrusion 300-P which protrudes from the planar portion 300-N. An area or size of the planar portion 300-N may substantially correspond to that of the light guide plate 300 of FIG. 2, in the top plan view.

The protrusion 300-P protrudes from the planar portion 300-N in the second direction DR2 and a direction opposite thereto. The protrusion 300-P is inserted into a space defined between the lower supports 200L-SP and the guide 200L-GD adjacent thereto in the first direction DR1.

In one or more exemplary embodiment of the display apparatus according to the invention, include the protrusion 300-P of the light guide plate 300-1 and the guide 200L-GD of the lower protection member 200L-1 cooperate with each other to stably accommodate the light guide plate 300-1 and restrict movement thereof according to a deformation of the light guide plate 300-1. The protrusion 300-P and the guide 200L-GD may reduce or effectively prevent the light guide plate 300-1 from being separated from the lower protection member 200L-1 due to the deformation of the light guide plate 300-1. The protrusion 300-P and the guide 200L-GD may reduce or effectively prevent the light guide plate 300-1 from being separated form the lower protection member 200L-1 such as in the third direction DR3 due to the deformation of the light guide plate 300-1

Figure 8:
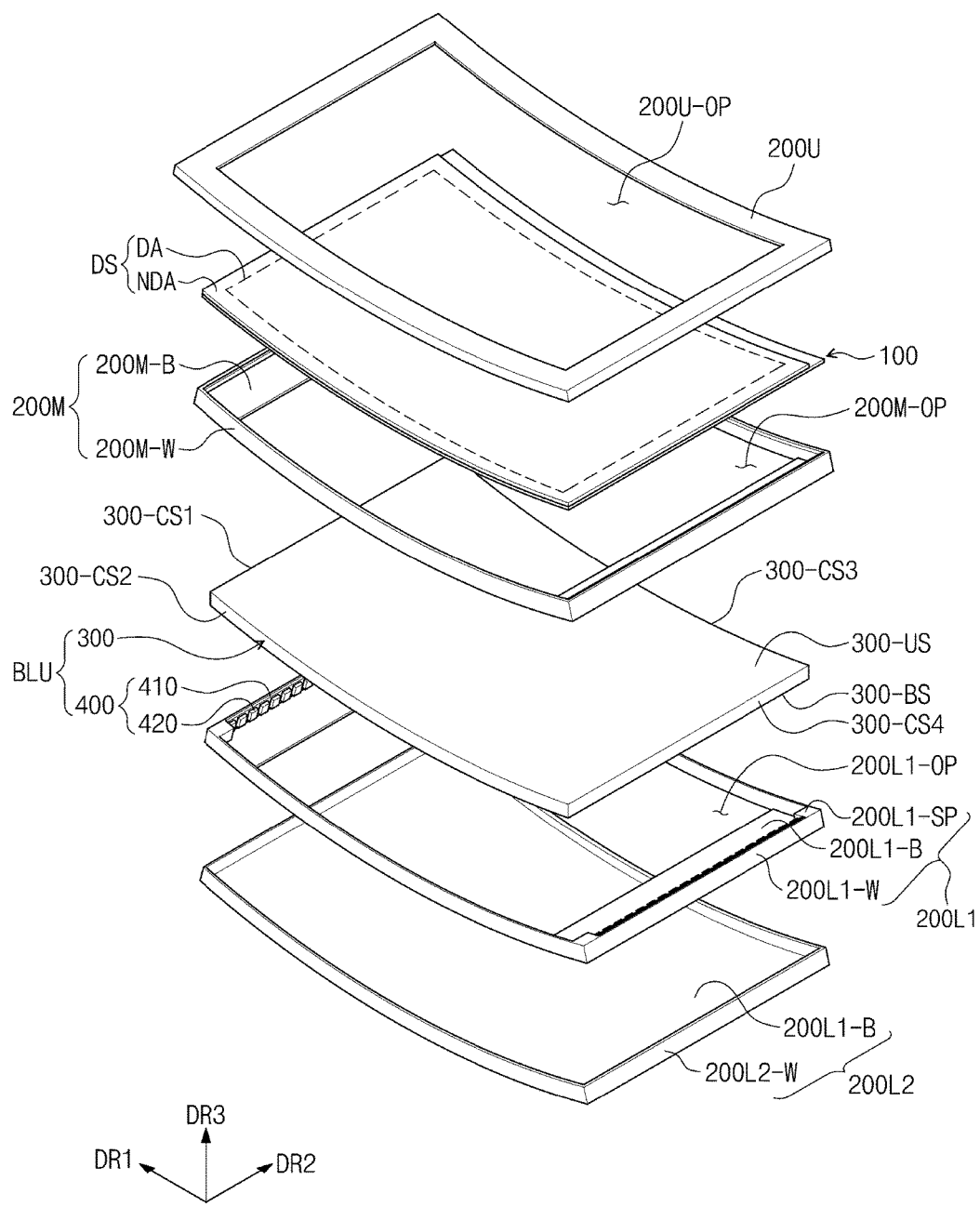
FIG. 8 is an exploded perspective view of another exemplary embodiment of a display apparatus according to the invention.
Figure 9A:
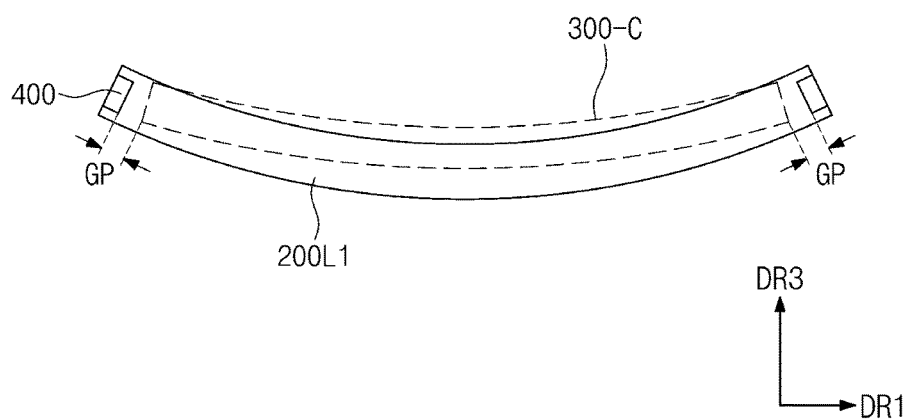
FIGS. 9A and 9B are schematic cross-sectional views illustrating an exemplary embodiment of first and second states of a portion of constituent elements of the display apparatus of FIG. 8 according to the invention.
Figure 9B:
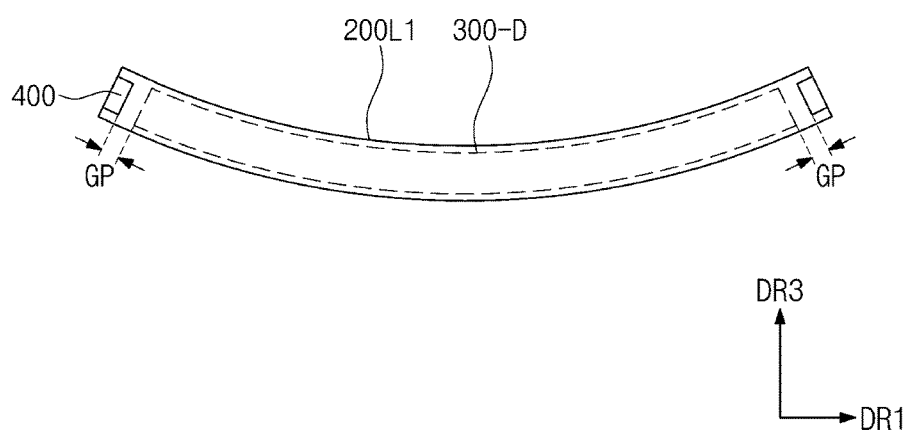

FIG. 8 is an exploded perspective view of another exemplary embodiment of a display apparatus according to the invention. FIGS. 9A and 9B are schematic cross-sectional views illustrating states of an exemplary embodiment of a portion of constituent elements of the display apparatus in FIG. 8 according to the invention.

FIG. 9A illustrates a cross-sectional view in the first state of the light guide plate 300, and FIG. 9B illustrates a cross-sectional view in the second state of the light guide plate 300. The first state corresponds to the first state of FIG. 6A, and the second state corresponds to the second state of FIG. 6B.

Hereinafter, another exemplary embodiment of the display apparatus according to the invention will be described with reference to FIGS. 8 to 9B. However, the same reference numeral may be given to the same components as those of FIGS. 1 to 7D, and their detailed descriptions will be omitted. The feature labeled 400 in FIGS. 9A and 9B represent a portion of the light source member 400 in FIG. 8 which is closest to the light guide plate 300, and other detailed features of the light source member 400 in FIG. 8 are omitted in FIGS. 9A and 9B for convenience of description.

Referring to FIG. 8, the display apparatus may include a plurality of lower protection members 200L1 and 200L2 which are separate elements from each other. The lower protection members 200L1 and 200L2 include a first lower protection member 200L1 and a second lower protection member 200L2.

The first lower protection member 200L1 includes a bottom portion 200L1-B, a sidewall portion 200L1-W, and a support 200L1-SP provided in plurality. A predetermined opening 200L1-OP is defined in and by the bottom portion 200L1-B.

The light guide plate 300 may secure or define a deformable space which is extended through the opening 200L1-OP. Referring to FIG. 9A, the light guide plate 300-C in the first state may be curved at a mean curvature less than that of the first lower protection member 200L1.

Accordingly, in the first state, the light guide plate 300-1 may be partially separated from the first lower protection member 200L1 to be disposed outside thereof (dotted line 300-C is outside the boundary of 200L1). Here, since movement of the light guide plate 300 in the first direction DR1 is restricted by support of the supports 200L1-SP spaced apart in the first direction DR1, the light guide plate 300 may be stably accommodated by the first lower protection member 200L1 even though the light guide plate 300 has a curvature different from that of the first lower protection member 200L1.

Thereafter, referring to FIG. 9B, since the light guide plate 300-C expands to be disposed in the second state (300-D) thereof, the light guide plate 300-D may be curved at a curvature corresponding to that of the first lower protection member 200L1. Accordingly, in the second state, the light guide plate 300-1 may be disposed within the first lower protection member 200L1 (dotted line 300-D is completely within the boundary of 200L1). That is, the second state light guide plate 300-D is stably provided in the first lower protection member 200L1 even in an expanded second state.

In the illustrated exemplary embodiment, the first lower protection member 200L1 may have a shape corresponding to that of the intermediate protection member 200M. In one or more exemplary embodiments of the display apparatus according to the invention, the light guide plate 300 may be entirely accommodated in the lower protection member 200L of FIG. 2 having the closed rear surface or the first lower protection member 200L1 of FIG. 8 of which a portion of a back surface thereof is opened.

Also, the second lower protection member 200L2 includes a bottom portion 200L2-B and a sidewall portion 200L2-W. The second lower protection member 200L2 may substantially correspond to the first lower protection member 200L1 of FIG. 8, e.g., corresponding to a general bottom chassis. Hereinafter, its detailed descriptions will be omitted. The first lower protection member 200L1 may be accommodated within the second lower protection member 200L2.

According to one or more exemplary embodiment of the invention, the direction of expansion or contraction of the light guide plate of a display apparatus, which may occur during use of the display apparatus, may be induced in a thickness direction of the display apparatus, but not in a planar direction of the display apparatus such as in the direction of the light source. Therefore, the display apparatus including the light guide plate having the variable curvature may be provided. That is, movement of the light guide plate due to expansion or contraction thereof may be restricted in a direction towards the light source, while being induced in a thickness direction of the display apparatus. Here, movement of the light guide plate may be induced only in the thickness direction of the display apparatus.

According to one or more exemplary embodiments of the invention, the gap between the light guide plate and the light source may be uniformly maintained even though the light guide plate is deformed by heat. Therefore, damage to the light source by the expansion of the light guide plate or damage to the light guide plate by the heat generated from the light source may be reduced or effectively prevented.

It will be apparent to those skilled in the art that various modifications and variations can be made in the present disclosure. Thus, it is intended that the present disclosure covers the modifications and variations of the invention provided they are within the scope of the appended claims and their equivalents.

What is claimed is:

1. A display apparatus comprising:
   a display panel which displays an image, the display panel curved at a first mean curvature with respect to a bending axis and defining a display surface thereof at which the image is displayed;
   a backlight unit comprising:
      a light source which generates a light; and
      a light guide plate which receives the light from the light source and provides the received light to the display panel, the light guide plate curved with respect to the bending axis; and
   a protection member in which the backlight unit is accommodated, the protection member curved at a second mean curvature with respect to the bending axis, the second mean curvature being different from the first mean curvature,
   wherein
   the light guide plate is curved at a third mean curvature between the first mean curvature and the second mean curvature,
   the light guide plate is accommodated in a space between the display panel and the protection member, and
   a space distance between the display panel and the protection member increases as distance from the light source increases.

2. The display apparatus of claim 1, wherein the space distance in a central region of the display panel is greater than the space distance in an edge region of the display panel.

3. The display apparatus of claim 1, wherein
   the light guide plate defines:
      a front surface thereof facing the display panel,
      a rear surface thereof opposing the front surface, and
      connecting surfaces thereof each of which connects the front surface to the rear surface, wherein the protection member comprises in a top plan view:
         sidewalls which together surround the connecting surfaces of the light guide plate; and
         a support provided in plurality each respectively disposed at intersections of two sidewalls among the sidewalls of the protection member and each facing a portion of the connecting surfaces of the light guide plate.

4. The display apparatus of claim 2, wherein the display surface defines a concave surface.

5. The display apparatus of claim 2, wherein the display surface defines a convex surface.

6. The display apparatus of claim 3, wherein
   the light source comprises a first light source fixed to a first sidewall among the sidewalls of the protection member,
   first and second supports among the supports of the protection member are disposed at the first sidewall,
   a first connecting surface facing the first sidewall among the connecting surfaces of the light guide plate is defined as a first light incident surface of the light guide plate,
   the first sidewall defines a first support surface to which the first light source is fixed, and
   the first and second supports each define a second support surface parallel to the first support surface and facing the first light incident surface of the light guide plate.

7. The display apparatus of claim 3, wherein the protection member further comprises a bottom portion commonly connected to the sidewalls and the supports to face the rear surface of the light guide plate.

8. The display apparatus of claim 4, wherein the second mean curvature of the protection member is greater than the first mean curvature of the display panel.

9. The display apparatus of claim 5, wherein the second mean curvature of the protection member is less than the first mean curvature of the display panel.

10. The display apparatus of claim 6, wherein a gap from the first light incident surface of the light guide plate to the light source is less than or equal to about 0.2 millimeter.

11. The display apparatus of claim 6, wherein
the light source further comprises a second light source fixed to the first sidewall and a second light source fixed to a second sidewall facing the first sidewall among the sidewalls of the protection member,
third and fourth supports among the supports of the protection member are disposed at the second sidewall,
a second connecting surface facing the second sidewall among the connecting surfaces of the light guide plate is defined as a second light incident surface of the light guide plate,
the second sidewall defines a third support surface to which the second light source is fixed, and
the third and fourth supports each define a fourth support surface parallel to the third support surface and facing the second light incident surface of the light guide plate.

12. The display apparatus of claim 11, wherein the protection member further comprises in a direction between the first and second sidewalls thereof:
a first guide provided in plural each respectively disposed spaced apart from the first and second supports at the first sidewall, and
a second guide provided in plural each respectively disposed spaced apart from the third and fourth supports at the second sidewall.

13. The display apparatus of claim 12, wherein
the light guide plate further defines a planar portion thereof and a plurality of protrusions thereof which protrude from the planar portion, and
the protrusions are respectively extended into spaces between the first guide and each of the first and second supports and spaces the second guide and each of the third and fourth supports.

14. A display apparatus comprising:
a display panel which generates and display an image with light, the display panel curved at a first mean curvature with respect to a bending axis and defining a display surface thereof at which the image is displayed;
a backlight unit comprising:
a light source which generates the light; and
a light guide plate which receives the light from the light source and provides the received light to the display panel, the light guide curved with respect to the bending axis; and
a protection member in which the backlight unit is accommodated, the protection member curved at a second mean curvature different from the first mean curvature, wherein
to define a variable mean curvature of the light guide plate accommodated in the protection member, the protection member restricts expansion and contraction of the light guide plate in a direction towards the light source and induces the expansion and contraction of the light guide plate in a thickness direction of the display apparatus, and
the variable mean curvature of the light guide plate varies between the first mean curvature of the display panel and the second mean curvature of the protection member.

15. The display apparatus of claim 14,
the backlight unit is driven by applying power thereto, and
the variable mean curvature of the light guide plate increases to approach a greater mean curvature among the first mean curvature and the second mean curvature, as a continuous driving time of the backlight unit increases.

16. A display apparatus comprising:
a display panel which generates and display an image with light, the display panel curved at a first mean curvature with respect to a bending axis and defining a display surface thereof at which the image is displayed;
a backlight unit comprising:
a light source which generates the light; and
a light guide plate which receives the light from the light source and provides the received light to the display panel, the light guide curved with respect to the bending axis; and
a protection member in which the backlight unit is accommodated, the protection member curved at a second mean curvature different from the first mean curvature,
wherein the light guide plate has a variable mean curvature within the protection member such that:
expansion of the light guide plate within the protection member, in a direction towards the light source, protrudes the light guide plate out of the protection member in a thickness direction of the protection member, and
contraction of the light guide plate within the protection member, in a direction away from the light source, disposes less of the light guide plate protruding out of the protection member in the thickness direction.

* * * * *